(No Model.)
M. D. SHIPMAN & W. S. REYNOLDS.
LIVE STOCK WAGON.
No. 404,018. Patented May 28, 1889.
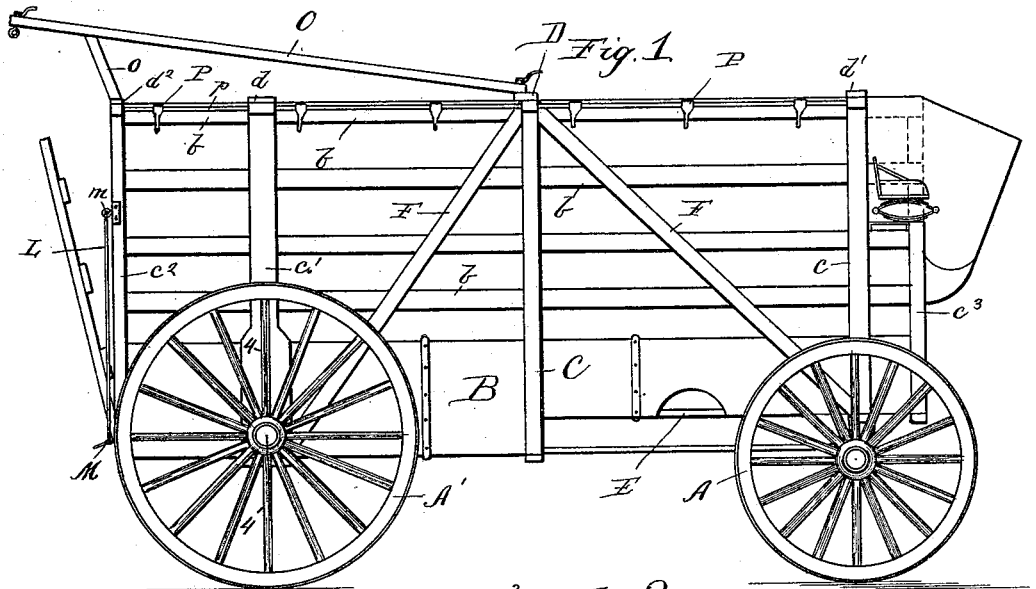
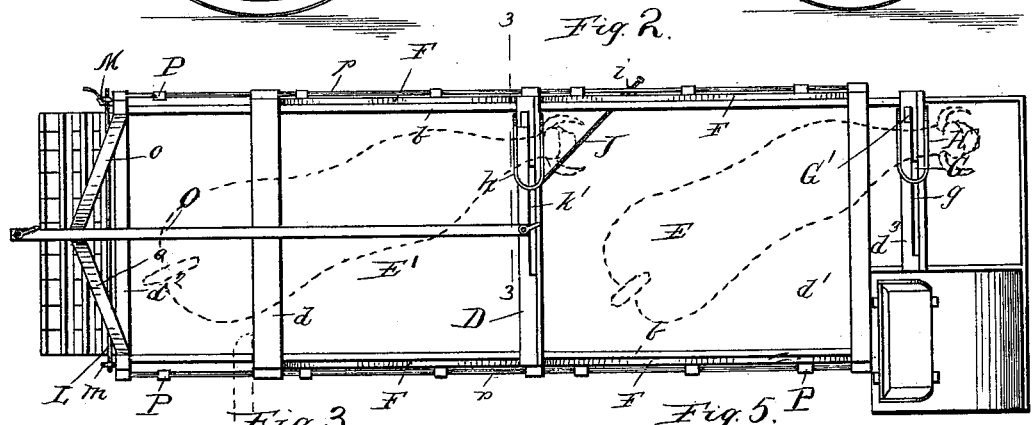
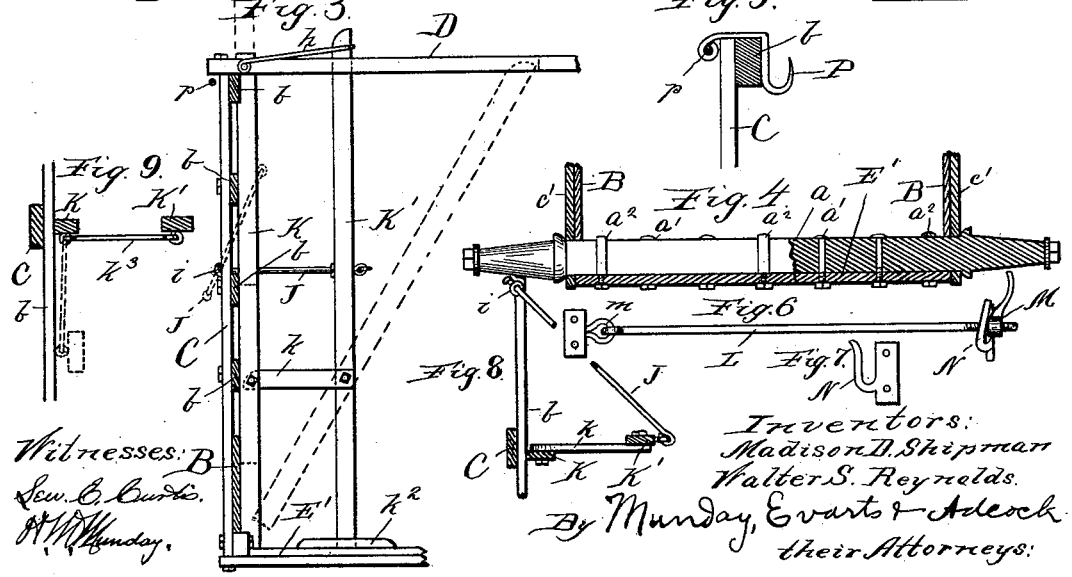
Witnesses:
Inventors:
Madison D. Shipman
Walter S. Reynolds
By Munday, Evarts & Adcock
their Attorneys.

UNITED STATES PATENT OFFICE.

MADISON D. SHIPMAN AND WALTER S. REYNOLDS, OF DE KALB, ILLINOIS.

LIVE-STOCK WAGON.

SPECIFICATION forming part of Letters Patent No. 404,018, dated May 28, 1889.

Application filed August 4, 1888. Serial No. 282,016. (No model.)

*To all whom it may concern:*

Be it known that we, MADISON D. SHIPMAN and WALTER S. REYNOLDS, citizens of the United States, residing in De Kalb, in the county of De Kalb and State of Illinois, have invented a new and useful Improvement in Live-Stock Wagons, of which the following is a specification.

This invention relates to wagons for transporting live stock, of the kind illustrated in patent to Samuel D. Reynolds, No. 244,077, of July 12, 1881, and is an improvement upon the wagon patented in that patent.

Our wagon is adapted to carry two ordinary-sized animals, and is made but little longer than the wagons heretofore employed for carrying one animal. To obtain this economy in size and increase its capacity, we position the animals at an angle to the line of the wagon, so that they stand with the head of the rear one abreast of the hindquarters of the front one; and in order to thus position them the stanchions or devices for securing their heads are both located at the same side of the wagon. This construction and other features of our invention adapted to increase the capacity and usefulness of the wagon are fully set forth in our description now to be given, and are illustrated in the accompanying drawings, wherein similar letters of reference indicate like parts, and in which—

Figure 1 is a side elevation of our invention, and Fig. 2 a plan of the cage or body thereof. Fig. 3 is a detail elevation of the stanchion for holding the animal carried in the rear portion of the wagon. Fig. 4 is a section on the line 4 4 of Fig. 1, and illustrates the manner of securing the floor to the rear axle. Fig. 5 shows the construction of the meat-hooks. Figs. 6 and 7 are details of the latch for the end-gate. Fig. 8 shows the guard for confining the front animal and the manner of its attachment. Fig. 9 illustrates a modified manner of attaching the movable part of the stanchion *f*. (Shown at Fig. 3.)

In said drawings, A represents the front wheels, and A' the rear wheels.

B B are the side-boards, $b\ b$ the side rails, C $c\ c'\ c^2\ c^3$ the vertical standards, and D $d\ d'\ d^2\ d^3$ the top braces, of the wagon forming the cage. The forward half of the wagon is provided with a floor, E, somewhat elevated above that of the rear half, in order to give room for the front wheels in turning. The rear floor, E', is preferably passed under the rear axle, $a$, and secured thereto by bolts $a'$ and clips $a^2$, as shown at Fig. 4, thereby lowering a portion of the load between the wheels sufficiently to render tipping over a very improbable occurrence and enabling the use of an axle extending from wheel to wheel.

In the formation of the cage a truss may be constructed at each side adapted to sustain the center of the wagon by means of the inclined bars F, extending from the front and rear axles, respectively, to the top of the vertical standard C.

At the front the stanchion for securing the animal shown in said Reynolds' patent may be employed, the free end of the movable or hinged bar shown at G sliding in a slot, $g$, in the top brace, $d^3$, and locked when in use by a hinged loop, H. The top of the stationary bar forming the other part of the stanchion is indicated at G'. This stanchion is located at one of the front corners of the wagon, so that the animal's nose will project in front of the main body of the wagon, thereby reducing the space necessary to be given to the front animal; and in order to insure the proper position by the animal standing in the front part of the wagon—namely, at an angle to the line of the vehicle—a guard is employed, as indicated at J, the space protected by this guard giving room for the head of the animal confined in the rear half of the wagon, whose stanchion-bars are located about midway of the wagon and shown at K and K', respectively, the former being stationary and the latter movable.

As it may be necessary or desirable to move the latter bar entirely out of its position when putting in or taking out the animal carried in the forward part of the wagon, I secure said bar to the stationary bar by a pivoted connection, $k$, near the bottom, the top working in the slot $k'$ in the top brace, D. This allows it to be swung over against the stationary bar, as indicated in broken lines in Fig. 3. A stop, $k^2$, upon the floor and loop $h$ at the top are also used to lock it when in acting position. When the animal is to be released, the bar is thrown back, as also indicated by the broken lines in Fig. 3. The guard J is also preferably movable to a position where it cannot interfere with the putting in or taking out of the animals, and hence I secure it to the bar K' by an eye-joint, as illustrated, and give its other end freedom to slide in an eye, $i$, upon one of the side rails $b$. In this manner the moving of the bar to the collapsed position automatically operates to move the guard out of the way, and the guard in no way interferes with the other movements of the bar.

A further feature serving to aid in the economy of area required in the wagon is the location of the driver's seat at the side of the wagon and abreast of the stanchion for holding the forward animal, as illustrated.

The end-gate is secured by a latch consisting of a rod, L, attached to one side of the wagon by eyes $m$, and having a tightening-nut, M, at its free end. The wagon at its other side carries a hook, N, adapted to receive such free end and provided with a projection, which may be formed by bending the point of the hook laterally, as illustrated, and serving in connection with said nut to confine and hold said free end, the operation being briefly this: After the rod is inserted in the hook the nut is tightened until contact with the hook results, and the projection or bend of the hook will now prevent the rod from being lifted out of it. The merit of this fastening is its extreme simplicity and the ease and quickness with which it is operated.

As wagons of this class are most frequently used by butchers, we provide them with a stout pole, O, attached at its front end to one of the top braces and extending over the rear of the wagon, which will be a convenience in hanging up the carcass after slaughtering. The projecting end of this pole is preferably elevated by braces $o$.

A further feature of convenience for butchers' use is found in the meat-hooks P, with which the wagon is provided, so that the same wagon which is used to carry the animals to the slaughter-house may carry the meat back to the store or consumer on its return trip. These hooks are located at the top of the sides, and are pivoted upon rods $p$, extending along the top rails $b$, and being fashioned as shown at Fig. 5 they may be thrown over on their pivot to the outside of the wagon when not in use. The rail and pivot sustain the weight when meat is hung upon them.

A modified manner of swinging the bar K' is found at Fig. 9, the connecting-piece answering to the part $k$ being in this instance a rod, $k^3$, secured at each end by eyes, which will allow the bar to swing in the arc of a circle to the position indicated in said figure; but in this case the top of the bar should be at liberty to swing far enough to free itself from both the floor-stop and the top brace, or those devices should be modified.

We claim—

1. A live-stock wagon adapted to be drawn by animal-power, of a size adequate to hold two animals and provided with stanchions for both said animals, such stanchions being located one at the front and one midway of the wagon, but upon the same side thereof, whereby the animals are confined with their heads to the front and their bodies at an angle to the line of the wagon, substantially as specified.

2. A live-stock wagon provided at one side with stanchions for two animals and a guard for positioning the front animal, substantially as specified.

3. A live-stock wagon adapted to be drawn by animal-power, having a stanchion for confining an animal at one side of the front end of the wagon and a driver's seat abreast of said stanchion, substantially as set forth.

4. A live-stock wagon having an elevated floor at its forward portion and a depressed floor at its rear portion and a stanchion for confining an animal upon each of such floor portions, substantially as set forth.

5. In a live-stock wagon, a depressed floor portion, E', secured to the under side of a straight or unbent rear axle, in combination with such axle, substantially as set forth.

6. A live-stock wagon the cage whereof embodies the diagonal braces F, extending from the axles, respectively, to the top center of the wagon, substantially as and for the purpose specified.

7. In a live-stock wagon, a cattle-stanchion consisting of a stationary bar and a movable bar, the latter connected by a connection pivoted to it and the stationary part, substantially as set forth.

8. In a live-stock wagon, a cattle-stanchion having a movable side, in combination with the slotted top brace, the floor-stop, and the pivotal connection to the stationary side, substantially as specified.

9. In a live-stock wagon, a cattle-guard, J, in combination with the cattle-stanchion K K', and connected to the movable part of the latter, substantially as specified.

10. The combination, with a live-stock wagon, of an end-gate fastening consisting of the rod hinged to one side of the wagon and having a tightening-nut at its free end, and a hook carried upon the other side of the wagon and adapted to receive such free end of the rod, and provided with a projection or bend adapted to act with the nut to confine the rod in the hook, substantially as specified.

11. A live-stock wagon having a top pole, O, projecting from the rear and adapted to sustain a slaughtered animal, substantially as set forth.

12. A live-stock wagon having meat-hooks pivoted along the top rail and adapted to be swung over said rail when not in use, substantially as specified.

13. A live-stock wagon provided with an animal-holding device—such as a stanchion—at its forward end, and also with another stanchion adapted to hold an animal in its rear portion and capable of being moved out of the way when putting in or removing animals from the forward portion, substantially as specified.

MADISON D. SHIPMAN.
WALTER S. REYNOLDS.

Witnesses:
D. W. GARRETSON,
JAS. H. PARKS.